United States Patent [19]

Izawa et al.

[11] 3,929,930

[45] Dec. 30, 1975

[54] GRAFT COPOLYMERIZING A STYRENE TYPE COMPOUND AND A POLYPHENYLENE ETHER

[75] Inventors: Shinichi Izawa, Tokyo; Juro Ozeki; Tsutomu Tanaka, both of Yokohama; Atsuo Nakanishi, Kanagawa, all of Japan

[73] Assignee: Asahi-Dow Limited, Japan

[22] Filed: Aug. 28, 1974

[21] Appl. No.: 501,450

[30] Foreign Application Priority Data

Sept. 6, 1973  Japan.................................. 48-99712

[52] U.S. Cl.......... 260/874; 260/876 R; 260/878 R; 260/880 R; 260/898; 260/901
[51] Int. Cl.² .................... C08L 23/00; C08L 25/00
[58] Field of Search ...................................... 260/874

[56] References Cited

UNITED STATES PATENTS

| | | | |
|---|---|---|---|
| 3,522,326 | 7/1970 | Bostick .............................. | 260/823 |
| 3,700,630 | 10/1972 | Hamada et al..................... | 260/874 |

*Primary Examiner*—Richard B. Turer
*Attorney, Agent, or Firm*—Cushman, Darby & Cushman

[57] ABSTRACT

A graft copolymer free from polyphenylene ether homopolymers is prepared by polymerizing 20 to 200 parts by weight of a styrene type compound at a temperature in the range from 130° to 200°C in the presence of 100 parts by weight of a polyphenylene ether and 0.1 to 15 parts by weight of a radical initiator. The graft copolymer is excellent in moldability and is also useful in making films, sheets, fibers, etc.

18 Claims, No Drawings

GRAFT COPOLYMERIZING A STYRENE TYPE COMPOUND AND A POLYPHENYLENE ETHER

This invention relates to a process for producing graft copolymers of polyphenylene ethers with styrene type compound polymers. More particularly, the invention pertains to a process for producing graft copolymers containing substantially no polyphenylene ether homopolymers which comprises polymerizing 20 to 200 parts by weight of a styrene type compound at a temperature in the range from 130° to 200°C. in the presence of 100 parts by weight of a polyphenylene ether and 0.1 to 15 parts by weight of a radical initiator.

Polyphenylene ethers are resins which have excellent mechanical properties, electrical characteristics, chemical resistance and heat resistance, low water absorptivity and high dimensional stability, and hence have recently been watched with keen interest. However, the polyphenylene ethers are too high in second transition point to be softened with ease, so that they have the drawback of being relatively low in moldability. Many processes have heretofore been proposed in order to overcome this drawback of polyphenylene ethers, and there has been adopted in practice a process in which polyphenylene ethers are blended with polystyrenes so as to have improved melt-flow property or moldability while maintaining their excellent properties. In addition thereto, there are a number of processes in which polyphenylene ethers are made into blends with other polymers, though articles molded from such blends have not been commercially available as yet.

Many techniques concerning the polymerization of styrenes in the presence of polyphenylene ethers are disclosed in U.S. Pat. Nos. 3,356,761, 3,384,682, 3,487,127, 3,557,045 and 3,664,997. All these patents point out that excellent substances as blends or thermosetting compositions comprising polyphenylene ethers and polystyrenes can be obtained. On the other hand, techniques concerning the graft polymerization of styrenes on polyphenylene ethers are disclosed in U.S. Pat. Nos. 3,522,326 and 3,700,630.

It is a well known fact that polyphenylene ethers and polystyrenes have extremely high mutual miscibility and are quite similar in solubility in solvents. Separation of a polyphenylene ether from a composition comprising the polyphenylene ether and a polystyrene was not successful for a long period, but has come to be easily conducted according to the method first revealed by A. Factor et al. in Journal of Polymer Science 7B 205 (1969) and U.S. Pat. No. 3,644,277. This method operates by combining the fact that a polyphenylene ether forms a complex with methylene chloride to become insoluble in methylene chloride with the fact that on heating, the said complex easily liberates the methylene chloride to give the polyphenylene ethere. Concretely, the above-mentioned method is based on such finding as mentioned below.

A composition comprising a polyphenylene ether and a polystyrene is charged in methylene chloride. Since methylene chloride is a good solvent for both of the polymers, the whole composition is dissolved uniformly in the methylene chloride. With lapse of time, however, the polyphenylene ether forms a complex with the methylene chloride to deposit a precipitate. After allowing the liquid to stand overnight, the precipitate is recovered by filtration and then dried at 50°C. for 2 hours, whereby only the polyphenylene ether can be recovered. The polystyrene is not entrained at all in the thus recovered polyphenylene ether.

On the other hand, many attempts have heretofore been made to separate a polystyrene from a composition comprising the polystyrene and a polyphenylene ether, and a process carried by extraction with hexane (Japanese Patent Publication No. 41,383/71) and processes effected by extraction with hot acetone containing 15 wt% of cyclohexane (Japanese Patent Publication Nos. 1,782/72 and 23,184/72) have actually been employed. These extraction processes utilize the fact that polystyrenes are somewhat higher in solubility than polyphenylene ethers. According to said processes, however, it is generally difficult to extract and remove the whole amount of the polystyrene present in the composition.

The process of the present invention has for the first time made it possible to obtain graft copolymers of polyphenylene ethers with polystyrenes in which there remain substantially no polyphenylene ether homopolymers. Many processes for improving the properties of polymers by blend polymerization or graft polymerization have been known hitherto, and it has been also known that graft polymers are better in mechanical properties. According to the conventional polymerization of styrenes in the presence of polyphenylene ethers or to the conventional graft polymerization of styrenes on polyphenylene ethers, graft copolymers are sometimes produced, but substantially all of the polyphenylene ethers are present in the form of homopolymers as they are. This fact is described in some of the prior art specifications, and has been confirmed also by experiments conducted by the present inventors as shown in Reference Examples set forth later.

The graft copolymers containing substantially no polyphenylene ether homopolymers which are obtained according to the process of the present invention are entirely novel type materials widely usable for the production of, for example, molding materials, films, sheets, fibers, etc.

The process of the present invention is carried out by adding a radical initiator and a styrene type compound to a polyphenylene ether, and then polymerizing the styrene type compound under anhydrous conditions either in the presence or absence of an organic solvent at a temperature in the range from 130° to 200°C. More particularly, the process is conducted in the following manner:

To 100 parts by weight of a polyphenylene ether are added 0.1 to 15 parts by weight of a radical initiator and 20 to 200 parts by weight of a styrene type compound either as it is or after heat treatment for a period corresponding to the half-value period of the radical initiator. The resulting mixture is heated at a temperature in the range from 130° to 200°C. to polymerize the styrene type compound for a period of time until it does not substantially remain in the mixture, whereby a graft copolymer substantially free from the polyphenylene ether homopolymer can be obtained. At the time of polymerization of the styrene type compound, an amount of an organic solvent may be added to facilitate the treatment of the resulting graft copolymer. Any organic solvent can be used in the graft copolymerization of the present invention, insofar as it can dissolve homogeneously the polyphenylene ether during the progress of the radical polymerization and is inert to said radical polymerization. Examples of organic solvents, which are useable alone as good solvents, are aromatic hydrocarbons such as benzene, toluene, xylene or ethyl benzene, halogenated aromatic hydrocarbons such as chlorobenzene, dichlorobenzene, trichlorobenzene or bromobenzene and so on. It is also possible to use a poor solvent in admixture with these solvents in an amount which does not cause precipitation of polymers during radical polymerization. The amount of the poor solvent should be 0 to 25 %, preferably 0 to 15 %, based on the total amount of the solvent. Examples of poor solvents are alkanes such as n-hexane, heptane or n-octane, cycloalkanes such as cyclohexane or cycloheptane, alcohols, e.g. alkanols such as isopropanol, n-butanol, n-hexanol, 2-ethyl hexanol, and so on. Alternatively, the polymerization may be effected by bulk polymerization.

It has experimentally been found that the radical initiator used in the present invention promotes the graft reaction onto the polyphenylene ether chain at the time of polymerization of the styrene type compound. If the radical initiator is absent, the polyphenylene ether homopolymer unavoidably remains in the resulting graft copolymer. Concrete examples of compounds usable as the radical initiator include di-tert-butyl peroxide, benzoyl peroxide, lauroyl peroxide, dicumyl peroxide, potassium persulfate, ammonium persulfate and sodium perborate. Other conventional radical initiators can also be employed. In combination with variations in polymerization temperature or the like, a combination of two or more radical initiators may be used. The amount of the radical initator used is 0.1 to 15 parts by weight, preferably 0.3 to 10 parts by weight, per 100 parts by weight of the polyphenylene ether. If the amount of the radical initiator is less than 0.1 part by weight, the polyphenylene ether homopolymer undesirably remains. If the amount of the radical initiator is more than 15 parts by weight, the chain length of the styrene type compound polymer to be graft polymerized becomes excessively short and the molecular weight of the styrene type compound homopolymer by-produced at the time of graft polymerization is lowered excessively, with the result that articles obtained from the resulting graft copolymer are undesirably deteriorated in physical properties.

The polyphenylene ether referred to in the present invention is a compound represented by the general formula,

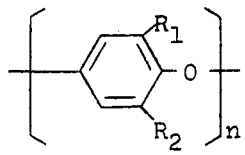

wherein $R_1$ and $R_2$ represent individually an alkyl group having 1 to 4 carbon atoms or a halogen atom, and n represents the polymerization degree. Concrete examples of the polyphenylene ethers include poly(2,6-dimethylphenylene-1,4-ether), poly(2,6-diethylphenylene-1,4-ether), poly(2-methyl-2-ethylphenylene-1,4-ether), poly(2-methyl-6-chlorophenylene-1,4-ether), poly(2,6-dichlorophenylene-1,4-ether), poly(2,6-di-n-propylphenylene-1,4-ether), poly(2-methyl-6-n-butylphenylene-1,4-ether) and poly(2-methyl-6-bromophenylene-1,4-ether).

The styrene type compound referred to in the present invention is styrene or an alkylated or halogenated styrene derivative. Concrete examples of the styrene type compound include styrene, α-methylstyrene, 2,4-dimethylstyrene, monochlorostyrene, dichlorostyrene, p-methylstyrene, p-tert-butylstyrene and p-ethylstyrene.

The styrene type compound may be used in combination with a copolymerizable vinyl compound. For example, methacrylic acid esters such as methyl methacrylate or ethyl methacrylate, acrylic acid esters such as butyl acrylate or 2-ethyl hexyl acrylate, or unsaturated nitrile compounds such as acrylonitrile or methacrylonitrile can be employed. Such a copolymerizable vinyl monomer is used in an amount of 0 to 100 parts by weight, preferably 0 to 70 parts by weight per 100 parts by weight of the styrene compound. Further, two or more styrene type compounds may be used.

The amount of the styrene type compound is in the range from 20 to 200 parts by weight, preferably from 25 to 170 parts by weight, per 100 parts by weight of the polyphenylene ether. If the amount of the styrene type compound is less than 20 parts by weight, the polyphenylene ether remains as it is without bonding to the sytrene typep compound. On the contrary, if the amount of the styrene type compound is more than 200 parts by weight, homopolystyrenes with low molecular weight are produced in large amounts and the product obtained is not suitable as a material for molded articles for which products of the present invention are intended. Accordingly, the amount of the styrene type compound may suitably be selected within the aforesaid range according to the desired ratio of polyphenylene ether to styrene type compound polymer in the resulting graft copolymer.

In the process of the present invention, the polymerization temperature of the styrene type compound to be graft copolymerized is in the range from 130° to 200°C., preferably 135° to 190°C. If the styrene type compound is polymerized at a temperature below 130°C., the chain transfer of the compound onto the polyphenylene ether chain is difficult, with the result that the polyphenylene ether homopolymer undesirably tends to remain. On the other hand, the adoption of a temperature above 200°C. is not desirable for the process of the present invention because a radical initiator capable of acting at said temperature, i.e. a radical initiator having a high decomposition temperature, is not obtainable and, at the same time, thermal polymerization and radical chain transfer of the styrene type compound are accelerated extremely to give a styrene type compound polymer which has an excessively short chain length.

The number average polymerization degree (n) of the polyphenylene ether used in the present invention is in the range from 50 to 300, preferably from 60 to 280, more preferably from 70 to 250. If the number average polymerization degree thereof is less than 50, the number of polyphenylene ether molecules per unit weight becomes large. Consequently, the polyphenylene ether homopolymer remains unless the amount of the styrene type compound is made extremely large. This tendency is particularly marked in case the polyphenylene ether homopolymer is lower in molecular weight. Thus, an article obtained from the resulting graft copolymer is undesirably deteriorated in physical properties. On the other hand, if the number average polymerization degree of the polyphenylene ether is more than 300, a gelation reaction undesirably takes place for unknown reasons to give, in some cases, a product which is not moldable. In view of easiness in handling at the time of graft reaction and of improvement in physical properties due to graft reaction, the use of a polyphenylene ether having a number average polymerization degree 70 to 250 is preferable.

In the case where the polyphenylene ether is poly(2,6-dimethylphenylene-1,4-ether), the relation between the number average molecular weight(determined by Vapor Pressure Osmometer) and $[\eta]$ has been studied in detail, and the correlation is expressed by the following equation:

$$[\eta] = 1.47 \times 10^{-4} \, Mn^{0.85}$$

In this case, the repeating unit of polymerization has the molecular weight of 122 and therefore the relation between the number average polymerization degree $n$ and $[\eta]$ can be calculated easily. For purpose of convenience, however, the molecular weight of the polyphenylene ether is expressed in the following Examples mostly in terms of $[\eta]$ which is experimentally determined.

In the process of the present invention, the styrene type compound is sometimes enhanced in reaction efficiency when the polyphenylene ether is pre-treated with a radical initiator, though such pre-treatment is not an essential condition of the present invention.

The fact that the graft copolymer obtained by the present invention contains no polyphenylene ether homopolymer can be confirmed by testing the copolymer according to the method reporated by A. Factor at al. to examime whether or not a methylene chloride complex of polyphenylene ether is separated. That is, ordinarily, the composition obtained according to the present process is uniformly soluble in methylene chloride without forming any precipitate. Even if a precipitate insoluble in methylene chloride is formed by allowing the methylene chloride solution to stand over a long period of time, the polymer obtained by sufficiently washing and drying the precipitate contains an inseparable styrene type compound polymer. In case at least 5% of polyphenylene ether homopolymer is present in the polyphenylene ether component of the composition, the said homopolymer can be easily detected according to the method of A. Factor et al., as will be immediately recognized by one skilled in the art.

The fact that graft copolymers obtained according to the prior art processes contain large amounts of polyphenylene ether homopolymers is shown below with reference to reference examples. In the examples all parts and percentages are by weight unless otherwise indicated.

REFERENCE EXAMPLE 1

8 Parts of polybutadiene and 1 part of mineral oil were dissolved in 55 parts of styrene monomer, and the resulting solution was polymerized under stirring at 120°C. to form a liquid having a total solid content of 34%. To this liquid was added a mixture comprising 6.7 parts of poly(2,6-dimethylphenylene-1,4-ether) having an intrinsic viscosity $\eta$ sp/c of 0.65, 0.15 part of t-butyl perbenzoate, 0.15 part of t-butyl peroxide and 29 parts of styrene monomer, thereby forming a homogeneous mixture. This mixture was added to a bath containing a suspension of 0.3 part of hydroxyethyl cellulose in 100 parts of water under stirring to form a homogeneous suspension. After flushing the space portion of the bath with nitrogen, the suspension was polymerized at 110°C. for 3 hours, at 120°C. for 1 hour, at 130°C. for 1 hour and at 140°C. for 1 hour in the indicated order to substantially terminate the polymerization. The resulting granular polymer was separated, washed with water and dried. From the infrared absorption spectrum of the polymer, it was found that the polymer contained 6.7% of polyphenylene ether. 2.0 Grams of this polymer were subjected to polyphenylene ether separation according to the method of A. Factor et al. to recover 0.105 g. of polyphenylene ether which corresponded to 78% of the polyphenylene ether present in the polymer. In this polyphenylene ether, no polystyrene in an amount confirmable by infrared absorption spectrography was present.

REFERENCE EXAMPLE 2

To a solution in 64 g. of industrial xylene of 16 g. of poly(2,6-dimethylphenylene-1,4-ether) having an intrinsic viscosity $[\eta]$ of 0.62 were added 16 g. of styrene, 200 g. of distilled water, 5 g. of sodium stearate, 0.2 g. of benzoyl peroxide, 0.5 g. of glucose and 0.5 g. of sodium pyrophosphate. Into the resulting mixture, nitrogen gas was injected under stirring at 620 r.p.m. to pure oxygen present in the system. Subsequently, the mixture was reacted at 80°C. for 10 hours, and then salted out by addition of 8 cc. of concentrated hydrochloric acid and 2 g. of magnesium chloride. The organic layer was charged into 500 ml. of methanol to form a precipitate, which was then recovered by filtration, washed with water and dried to obtain a white polymer. According to the infrared absorption spectrum of the polymer, the amount of polyphenylene ether contained in the polymer was 56 wt%.

2 Grams of this polymer was dissolved in 40 ml. of methylene chloride, and the resulting solution was stirred at 30°C. for 3 hours to deposit a precipitate. The precipitate was recovered by filtration, washed with methylene chloride, methylethylketone and methanol is indicated order and then dried. The weight of the precipitate was 0.64 g., which corresponded to 32 % of the polymer and to 57% of the polyphenylene ether present in the polymer. In the infrared absorption spectrum of this precipitate, no determinable absorption derived from polystyrene was observed.

REFERENCE EXAMPLE 3

Using 0.2 g. of potassium persulfate and 0.3 g. of sodium hydrogensulfite as catalysts, the polymerization of Reference Example 2 was repeated to obtain a white polymer, which contained 53% polyphenylene ether. 2 Grams of this polymer was treated with methylene chloride in the same manner as in Reference Example 2 to recover 0.56 g. of precipitate which corresponded to 53% of the polyphenylene ether contained in the polymer. In the infrared absorption spectrum of the precipitate, no substantial absorption derived from styrene was observed.

REFERENCE EXAMPLE 4

Using 0.2 g. of potassium peroxide as a catalyst, and 2.5 g. of polyoxyethylene monooleate and 2.5 g. of sodium laurate as surfactants, the polymerization of Reference Example 2 was repeated to obtain a white polymer, which contained 58% polyphenylene ether. This polymer was treated with methylene chloride in the same manner as in Reference Example 2 to obtain a precipitate corresponding to 46% of the polyphenylene ether contained in the polymer in which no polystyrene was detected, as confirmed by infrared spectroscopy.

REFERENCE EXAMPLE 5

To a thoroughly stirred mixture comprising 16 g. of poly(2,6-dimethylphenylene-1,4-ether) having an intrinsic viscosity [η] of 0.62, 48 g. of styrene, 0.168 g. of lauroyl peroxide, 0.072 g. of dicumyl peroxide and 1.6 g. of a polybutadiene-styrene graft copolymer (styrene:butadiene = 4:6) was added a solution in 144 g. of water of 0.144 g. of polyvinyl alcohol (polymerization degree 2,000, saponification degree 87 mole%) and 0.015 g. of sodium dodecylbenzenesulfonate. Into the resulting mixture, nitrogen gas was injected, with vigorous stirring at 620 r.p.m., to sufficiently purge oxygen present in the system. Subsequently, the mixture was reacted under stirring at 90°C. for 1 hour, and then subjected to steam distillation at 94°C. to azeotropically remove 33 g. of styrene out of the system. Thereafter, the reaction was performed by heating at 130°C. for 10 hours. After completion of the reaction, the product was subjected to filtration, washed with water and dried to obtain a white polymer. 5 Grams of this polymer was dissolved in 100 ml. of benzene, and the resulting solution was centrifuged at 10,000 r.p.m. for one hour. The supernatant was charged into 500 ml. of methanol to deposit a re-precipitate, which was then recovered by filtration, washed with water and dried.

The thus obtained re-precipitate polymer contained 60 % polyphenylene ether. 2 Grams of this polymer was treated in the same manner as in Reference Example 2 to obtain a precipitate corresponding to 65 % of the polyphenylene ether component. In this precipitate, no determinable amount of polystyrene was contained.

REFERENCE EXAMPLE 6

A re-precipitate was obtained in the same amount as in Reference Example 5, except that 0.144 g. of 2,4-dichlorobenzoyl peroxide and 0.144 g. of tert-butyl peroxybenzoate were used as the catalysts, the reaction at 90°C. was effected for 30 minutes and the amount of azeotropically removed styrene was 35 g. In this re-precipitate there was contained 64 % polyphenylene ether. 2 Grams of this polymer was treated with methylene chloride in the same manner as in Reference Example 2 to obtain a precipitate corresponding to 70 % of the polyphenylene ether contained in the polymer. Little polystyrene was detected by infrared absorption spectrum of the precipitate.

All the above-mentioned reference examples were conducted according to working examples of the prior art techniques for graft polymerization of styrenes on polyphenylene ethers. From these rererence examples, it has been confirmed that polymers obtained according to the prior art processes contain large amounts of polyphenylene ethers which have not taken part in graft polymerization.

The present invention is illustrated in detail below with reference to examples, in which all parts and percentages are by weight unless otherwise indicated.

EXAMPLE 1

A mixture comprising 50 g. of ethylbenzene and 50 g. of poly(2,6-dimethylphenylene-1,4-ether) having an intrinsic viscosity (η) of 0.62 (as measured in chloroform solution at 30°C.; the same shall apply hereinafter) was added to a 500 ml. separable flack equipped with a thermometer, a nitrogen injection pipe and a condenser, and then stirred at 120°C. to form a solution. After purging oxygen inside the system by injection of nitrogen gas, 4 g. of ditert-butyl peroxide was added to the solution, and the resulting mixture was stirred at 120°C. for 2 hours. Subsequently, 80 g. of styrene was added to the flask, and the mixture was polymerized at 130°C. for 2 hours. The reaction mixture was taken out of the flask, and then dried under reduced pressure at 215°C. for 1 hour to remove ethylbenzene and unreacted styrene, whereby a polymer was obtained. The polystyrene content of the polymer was 52 wt%. 2.0 Grams of this polymer was dissolved in 40 ml. of methylene chloride, and the resulting solution was allowed to stand at 30°C. No precipitate was observed at all even when the solution was allowed to stand for 6 hours.

EXAMPLE 2

In the same manner as in Example 1, an ethylbenzene solution of polyphenylene ether was prepared and the system was flushed with nitrogen. To the solution was added 1.5 g. of di-tert-butyl peroxide, and the resulting mixture was stirred at 135°C. for 20 minutes. Subsequently, 50 g. of styrene was added, and the mixture was polymerized at 135°C. for 2 hours. The reaction mixture was subjected to the same after-treatment as in Example 1 to obtain a polymer. The polystyrene content of the polymemr was 40 wt%. 2.0 Grams of this polymer was dissolved in 40 ml. of methylene chloride, and the resulting solution was allowed to stand at 30°C. The solution formed no precipitate at all after 3 hours' standing but formed a slight amount of a precipitate after 6 hours' standing. The precipitate was recovered by filtration, washed and then dried to obtain 76 mg. of a solid. From the infrared absorption spectrum of this solid, it was found that the solid contained 34 wt% of polystyrene.

EXAMPLE 3

A polymer was obtained by repeating the polymerization of Example 1, except that the radical initiator was replaced by 2.0 g. of dicumyl peroxide and the heat treatment time was varied to 20 minutes. 2.0 Grams of the polymer was dissolved in 40 ml. of methylene chloride, and the resulting solution was allowed to stand at 30°C. The solution formed no precipitate after 3 hours' standing but formed a precipitate after 6 hours' standing. The precipitate was recovered, washed and then dried to obtain 0.088 g. of a solid. This solid contained 32% of polystyrene.

EXAMPLE 4

A polymer was obtained by repeating the polymerization of Example 1, except that the styrene was replaced by a solution of styrene containing 6.2% of styrene-butadiene copolymer rubber (trade name Tufdene", produced by Asahi Kasei K.K.). 5.0 Grams of the polymer was dissolved in 100 ml. of benzene, and the resulting solution was treated with a centrifugal separator at 10,000 r.p.m. for 1 hour. The supernatant was charged into 500 ml. of methanol to deposit a re-precipitate, which was then recovered by filtration, washed with water and dried. 2.0 Grams of the re-precipitate was dissolved in 40 ml. of methylene chloride, and the resulting solution was allowed to stand at 30°C. The solution formed no precipitate after 3 hours' standing but formed 0.08 g. of a precipitate after 6 hours' standing. The precipitate contained 30% of polystyrene.

EXAMPLE 5

A polymer was obtained by repeating the polymerization of Example 3, except that the styrene was replaced by a solution of styrene containing, dissolved therein, 7.0 % of ethylene-propylenecis-1,4-hexadiene copolymer rubber. The polymer was treated in the same manner as in Example 4 to obtain a re-precipitate freed from benzene insolubles. 2.0 Grams of the re-precipitate was dissolved in 40 ml. of methylene chloride, and the resulting solution was allowed to stand at 30°C. The solution formed no precipitate after 3 hours' standing but formed 0.096 g. of a precipitate after 6 hours' standing. From the infrared absorption spectrum of the precipitate, it was confirmed that the precipitate contained 29% of polystyrene.

EXAMPLE 6

A polymer was obtained by repeating the polymerization of Example 1, except that the styrene was replaced by styrene containing, dissolved therein, 6.5% of polybutadiene (trade name "Diene NF-55", produced by Asahi Kasei Kogyo K.K.). The polymer was treated in the same manner as in Example 4 to obtain a benzene-soluble repreciptate. 2.0 Grams of this re-precipitate was dissolved in 40 ml. of methylene chloride, and the resulting solution was allowed to stand at 30°C. The solution formed no precipitate at all even after 6 hours' standing.

EXAMPLE 7

A polymer was obtained by repeating the polymerization of Example 1, except that the polyphenylene ether was replaced by 50 g. of poly(2,6-dimethylphenylene-1,4-ether) having an intrinsic viscosity ($\eta$) of 0.35. 2.0 Grams of the polymer was dissolved in 40 ml. of methylene chloride, and the resulting solution was allowed to stand at 30°C. The solution formed no precipitate at all after 3 hours' standing but formed 0.070 g. of a precipitate after 10 hours' standing. The precipitate was composed of 30% of polystyrene and 70% by polyphenylene ether.

EXAMPLE 8

A polymer was obtained by repeating the polymerization of Example 1, except that the polyphenylene ether was replaced by 50 g. of poly(2,6-dimethylphenylene-1,4-ether) having an intrinsic viscosity ($\eta$) of 0.28. The polymer contained 54% of polystyrene. 2.0 Grams of this polymer was dissolved in 40 ml. of methylene chloride, and the resulting solution was allowed to stand at 30°C. The solution formed no precipitate at all after 3 hours' standing but formed 0.045 g. of a precipitate after 10 hours' standing. The precipitate was composed of 32% of polystyrene and 68% of polyphenylene ether.

EXAMPLE 9

A mixture comprising 50 g. of ethylbenzene, 50 g. of poly(2,6-dimethylphenylene-1,4-ether) having an intrinsic viscosity ($\eta$) of 0.34, 80 g. of styrene and 2.0 g. of dicumyl peroxide was added to a 500 ml. separable flask equipped with a thermometer, a nitrogen injection pipe and a condenser, and then stirred at 60°C. to form a homogeneous solution. After purging oxygen inside the system by injection of nitrogen gas, the solution was polymerized at 137°C. for 2 hours. The reaction mixture was taken out of the flask, and then dried under reduced pressure at 215°C. for 1 hour to remove ethylbenzene and unreacted styrene, whereby a polymer was obtained. The polymer contained 47% of polystyrene. This polymer was dissolved in methylene chloride under the same conditions as in Example 1. The solution formed no precipitate at all even after 6 hours' standing.

EXAMPLE 10

The polymerization of Example 9 was repeated, except that the amount of styrene was decreased from 80 g. to 50 g. The resulting polymer contained 41% of polystyrene. This polymer was dissolved under the same conditions as in Example 1. The solution formed no precipitate after 3 hours' standing but formed 4.2% of a precipitate after 6 hours' standing. The precipitate was composed of 26% of polystyrene and 74% of polyphenylene ether.

EXAMPLE 11

The polymerization of Example 10 was repeated, except that the radical initiator was replaced by 2.0 g. of lauroyl peroxide and the polymerization time was varied to 1.0 hour. The resulting polymer contained 25% of polystyrene. This polymer was dissolved under the same conditions as in Example 1. The solution formed no precipitate after 3 hours' standing but formed 3.8% of a precipitate after 6 hours' standing. The precipitate was composed of 14% of polystyrene and 86% of polyphenylene ether.

EXAMPLE 12

Using a mixture comprising 80 g. of ethylbenzene, 80 g. of poly(2,6-dimethylphenylene-1,4-ether) having an intrinsic viscosity ($\eta$) of 0.31, 40 g. of styrene and 1.5 g. of di-tert-butyl peroxide, the polymerization of Example 9 was repeated. The resulting polymer contained 21% of polystyrene. This polymer was dissolved in methylene chloride under the same conditions as in Example 1. The solution formed no precipitate after 3 hours' standing but formed 5.4% of a precipitate after 6 hours' standing. According to infrared absorption spectography, the precipitate was composed of 13% of polystyrene and 87% of polyphenylene ether.

EXAMPLE 13

The polymerization of Example 12 was repeated, except that the polymerization time was varied to 4.0 hours. The resulting polymer contained 32% of polystyrene. A methylene chloride solution of the polymer formed no precipitate at all even after 6 hours.

EXAMPLE 14

The polymerization of Example 9 was repeated, except that the ethylbenzene was not used and the polymerization time was changed to 45 minutes. The resulting polymer contained 42% of polystyrene. This polymer was dissolved in methylene chloride under the same conditions as in Example 1. The solution formed no precipitate at all even after lapse of 6 hours.

EXAMPLE 15

A mixture comprising 100 g. of poly(2,6-dimethylphenylene-1,4-ether) having an intrinsic viscosity ($\eta$) of 0.38 and 80 g. of ethylbenzene was fed to 500 ml. separable flask, and then heated to 120°C. to form a homogeneous solution. To this solution was added a solution of 4.0 g. of di-tert-butyl peroxide in 40 g. of styrene, and the resulting mixture was gradually heated to 155°C. in a period of 30 minutes, and then stirred at 155°C. for 2.5 hours. Subsequently, the reaction mixture was taken out of the flask and dried under reduced pressure at 215°C. for 1 hour by means of a vacuum drier to remove volatiles, whereby a polymer was obtained. The polymer contained 72.5% of polyphenylene ether. 2.0 Grams of this polymer was dissolved in 40 ml. of methylene chloride, and the resulting solution was allowed to stand at 30°C. The solution formed no precipitate at all even after 24 hours' standing.

EXAMPLE 16

Example 15 was repeated, except that the polymerization was conducted at 180°C. for 1 hour. The resulting polymer contained 73% of polyphenylene ether. A solution of 2.0 g. of the polymer in 40 ml. of methylene chloride formed no precipitate at all even after standing for 24 hours.

EXAMPLE 17

Example 15 was repeated, except that the amount of styrene was decreased to 25 g. The resulting polymer contained 81.5% of polyphenylene ether. A solution of 2.0 g. of the polymer in 40 ml of methylene chloride formed no precipitate at all even after standing for 24 hours.

EXAMPLE 18

Example 15 was repeated, except that the polyphenylene ether was replaced by 100 g. of poly(2,6-dimethylphenylene-1,4-ether). After the reaction at 155°C. for 30 minutes, one half of the reaction mixture was taken out to obtain a polymer (A), while the other half of the reaction mixture was polymerized at said temperature for additional 2.5 hours to obtain a polymer (B). The polyphenylene ether contents of the polymers (A) and (B) were 75.8% and 72.0%, respectively. 2.0 Grams of each of the polymers (A) and (B) are dissolved in 40 ml. of methylene chloride, and the resulting solution was allowed to stand at 30°C. to obtain the results shown in the following table:

Amount of precipitate (mg) and content of polystyrene (%)

| Standing time (hrs) | 3 | 6 | 24 |
|---|---|---|---|
| Polymer (A) | 0 | 210 (4.0%) | 620 (13%) |
| Polymer (B) | 0 | 0 | 0 |

EXAMPLE 19

A mixture comprising 100 g. of poly(2,6-dimethylphenylene-1,4-ether) having an intrinsic viscosity ($\eta$) of 0.36 and 80g. of ethylbenzene was fed to a 500 ml. separable flask, and then heated to 120°C. to form a homogenous solution. To this solution were added 6 g. of dicumyl peroxide and 60 g. of styrene, and the resulting mixture was gradually heated to 170°C. in a period of 1 hour, and then stirred at 170°C. for 2.0 hours. Thereafter, the reaction mixture was taken out of the flask and dried under reduced pressure at 215°C. for 1 hour by means of a vacuum drier to remove volatiles, whereby a polymer was obtained. The polymer contained 62.9% of polyphenylene ether. A solution of 2.0 g. of the polymer in 40 ml. of methylene chloride formed no precipitate at all even after standing for 24 hours.

EXAMPLE 20

Example 19 was repeated, except that the amount of styrene was varied to 150 g. The resulting graft copolymer contained 40.3% of polyphenylene ether. A solution of 2.0 g. of the polymer in 40 ml. methylene chloride formed no precipitate at all even after standing for 24 hours.

EXAMPLE 21

Example 19 was repeated, except that the amount of styrene was varied to 30 g. and the polymerization temperature was elevated to 190°C. The resulting polymer contained 77.2% of polyphenylene ether. A solution of 2.0 g. of the polymer in 40 ml. of methylene chloride formed no precipitate at all during 3 hours' standing but formed 0.35 g. of a precipitate after 6 hours' standing. The precipitate was composed of 83% of polyphenylene ether and 17% of polystyrene.

EXAMPLE 22

A mixture comprising 150 g. of poly(2,6-dimethylphenylene-1,4-ether) having an intrinsic viscosity ($\eta$) of 0.65 and 150 g. of ethylbenzene was fed to a 1,000 ml. flask, and then heated to 120°C. to form a homogeneous solution. To this solution were added 1.4 g. of di-tert-butyl peroxide and 150 g. of styrene. The resulting mixture was gradually heated to 140°C. in a period of 30 minutes, and then polymerized at 140°C. for 8 hours. Thereafter, the polymerization mixture was taken out of the flask and dried under reduced pressure at 215°C. for 1 hour by means of a vacuum drier to remove volatiles, whereby a polymer was obtained. The polymer contained 52.5% of polyphenylene ether. A solution of 2.0 g. of the polymer in 40 ml. of methylene chloride formed no precipitate at all even after standing for 24 hours.

EXAMPLE 23

Example 22 was repeated, except that the amount of ditert-butyl peroxide was changed to 2.5 g. and the polymerization was conducted at 145°C. for 5 hours. The resulting graft copolymer contained 50.5% of polyphenylene ether. A solution of 2.0 g. of the polymer in 40 ml. of methylene chloride formed no precipitate at all even after standing for 24 hours.

EXAMPLE 24

Example 22 was repeated, except that the amount of styrene was changed to 250 g. and the amount of di-tert-butyl peroxide was changed to 2.0 g. The resulting graft copolymer contained 37.8% of polyphenylene ether. A solution of 2.0 g. of the polymer in 40 ml. of methylene chloride formed no precipitate at all even after standing for 24 hours.

EXAMPLE 25

Example 9 was repeated, except that 80 g. of monochlorostyrene was used in place of styrene. The resulting polymer contained 58% polymonochlorostyrene. This polymer was dissolved in methylene chloride under the same conditions as in Example 1, whereby no precipitate was formed at all even after standing for 6 hours.

EXAMPLE 26

Example 22 was repeated, except that 150 g. of 2,4-dimethyl styrene was used in place of styrene. The resulting polymer contained 48% poly(2,4-dimethyl styrene). A solution of 2.0 g. of the polymer in 40 ml. of methylene chloride formed no precipitate at all even after standing for 24 hours.

EXAMPLE 27

Example 15 was repeated, except that 40 g. of p-tert-butyl styrene was used in place of styrene. The resulting polymer contained 28.5% poly(p-tert-butyl styrene). A solution of 2.0 g. of the polymer in 40 ml. of methylene chloride formed no precipitate at all even after standing for 24 hours.

EXAMPLE 28

A mixture comprising 1.5 kg. of poly(2,6-dimethylphenylene 1,4-ether), 0.2 kg. of methyl methacrylate, 0.2 kg. of styrene, 3.0 kg. of ethyl benzene and 28 g. of dicumyl peroxide was charged into an autoclave of 10 liter capacity and heated at 80°C. to form a homogeneous solution. Then, while controlling the temperature inside the autoclave to 145° to 150°C., graft polymerization was carried out for 3.5 hours. Thereafter, the reaction product was taken out of the autoclave and dried under reduced pressure at 150°C. for 4 hours. The graft copolymer obtained had a composition of 78.9% of polyphenylene ether, 10.5% of methyl methyacrylate and 11.0% of styrene.

A solution of 2.0 g. of this graft copolymer in 40 ml. of methylene chloride formed no precipitate at all even after standing for 24 hours.

EXAMPLE 29

Into an autoclave of 10 liter capacity was charged a mixture comprising 1.0 kg. of ethyl benzene, 1.5 kg. of poly(2,6-dimethylphenylene-1,4-ether), 1.4 kg of styrene, 0.6 kg of acrylonitrile and 30 g of di-tert-butyl peroxide. The mixture was stirred at 60°C. to form an homogeneous solution. Then, oxygen gas in the reaction system was purged off by flushing the autoclave with nitrogen gas. Polymerization was effected for 2.5 hours, while controlling the temperature inside the autoclave to 135° to 140°C. The reaction product was taken out of the autoclave and dried at 215°C. in a vacuum drier to remove ethyl benzene and unaltered styrene, whereby a graft copolymer was obtained. The copolymer was analyzed by infrared absorption spectroscopy to give the result that it contained 40% styrene-acrylonitrile copolymer and the degree of grafting calculated therefrom was 67%. The acrylonitrile content in said styrene-acrylonitrile copolymer was 28%.

A solution of 2.0 g. of this graft copolymer in 40 ml. of methylene chloride formed no precipitate at all even after standing for 24 hours.

EXAMPLE 30

Example 15 was repeated, except that 100 g of a poly(2,6-diethylphenylene-1,4-ether) having a number average polymerization degree of 85 was used. The polymer obtained contained 73.5% polyphenylene ether. 1.0 Gram of this polymer was dissolved in 50 ml. of benzene, and n-hexane was gradually added to the solution until a minimum amount of precipitate was produced. The precipitate was separated by filtration, followed by washing and drying, and the composition was determined by IR analysis. This operation was repeated twice. In the first operation, the amount of precipitate was 8.2% with 11.5% polystyrene content, while in the second, the amount of precipitate was 6.2% with 12.0% of polystyrene content.

As a control test, a mixture of polystyrene and poly(2,6-diethylphenylene-1,4-ether)(1 : 3) was fractionated in the same manner as described above. As the result, no polystyrene was detected until 40% or more of precipitate was formed.

The above result shows that no polyphenylene ether homopolymer was present in the polymer of this Example.

EXAMPLE 31

Example 15 was repeated, except that 100 g. of a poly(2-methyl-6-chlorophenylene-1,4-ether) having a number average polymerization degree of 120 was used. The polymer obtained contained 72.0% polyphenylene ether. 1.0 Gram of this polymer was dissolved in 50 ml. of benzene and precipitation was effected in the same manner as in Example 30 to recover initial precipitation. The results of operations repeated twice were that the amount of precipitate was 11.5% with 13% polystyrene content in the first and the amount of precipitate 5.5% with 13% polystyrene content in the second. It was also confirmed that a mixture of homopolymers, used as control, could easily be separated by the above method.

CONTROL EXAMPLE 1

A mixture comprising 100 g. of poly(2,6-dimethylphenylene-1,4-ether) having an intrinsic viscosity ($\eta$) of 0.38 and 100 g. of ethylbenzene was fed to a 500 ml. separable flask, and then heated to 120°C. to form a homogeneous solution. To this solution were added 3.0 g. of di-tert-butyl peroxide and 10 g. of styrene. The resulting mixture was gradually heated to 150°C. in a period of 30 minutes, and then continuously stirred at 150°C. for 3 hours. Thereafter, the reaction mixture was taken out of the flask and dried under reduced pressure at 215°C. for 1 hour by means of vacuum drier to remove volatiles, whereby a polymer was obtained. The polymer contained 90.9% of polyphenylene ether. A solution of 2.0 g. of the polymer in 40 ml. of methylene chloride formed 1.2 g. of a precipitate after standing for 3 hours. The precipitate contained no detectable amount of polystyrene. Further, the solution formed 1.8 g. of a precipitate after standing for 6 hours. This precipitate was composed of 92% of polyphenylene ether and 8% of polystyrene.

CONTROL EXAMPLE 2

100 Grams of poly(2,6-dimethylphenylene-1,4-ether) and 80 g. of ethyl benzene were fed to one liter separable flask and the mixture was heated to 120°C to form a homogeneous solution. A solution of 4.0 g. of di-tert-butyl peroxide dissolved in 300 g. of styrene was added to the aforesaid solution and the mixture was gradually heated up to 155°C after 30 minutes. After the mixture was stirred at 155°C for 3 hours, the reaction product was taken out of the flask. The product was dried under reduced pressure in a vacuum drier at 215°C for one hour to remove volatiles. The resulting polymer contained 25.5% polyphenylene ether. 2.0 Grams of this polymer were dissolved in 40 ml. of methylene chloride and the solution was left to stand at 30°C. Even after standing for 24 hours, no precipitate was formed. This polymer had a $\eta sp/C$ of 0.22 in 0.5% chloroform and a film derived therefrom was deficient in the property of self-maintenance. A blended resin

15 mixture of this polymer with a rubber reinforced polystyrene (1 : 1) produced only cracked molded articles, on which no physical property could be measured.

CONTROL EXAMPLE 3

Into a one liter separable flask were fed 40 g. of a poly(2,6-dimethylphenylene-1,4-ether), 360 g. of styrene and 0.8 g. of benzoyl peroxide, and a homogeneous solution was formed at 100°C. Stirring of the solution was continued at 100°C for 10 hours until about 11% of styrene was polymerized. The resin formed had a composition of, as determined by IR analysis, 52% of polyphenylene ether, and 48% of polystyrene. When 2.0 g. of this resin was dissolved in 40 ml. of methylene chloride, the solution became immediately turbid, and the polymer obtained by filtration after 3 hours was 0.88 g. No detectable amount of polystyrene was present in the precipitate formed.

CONTROL EXAMPLE 4

Into a 3 liter autoclave were charged 400 g of ethyl benzene and 500 g of a poly(2,6-dimethylphenylene-1,4-ether) and the mixture was heated to 120°C to form a homogeneous solution. A solution of 20 g. of di-tert-butyl peroxide dissolved in 200 g. of styrene was added to this solution and the mixture was heated gradually up to 240°C after 30 minutes. After the mixture was stirred at 240°C for one hour, followed by cooling, the reaction product was taken out of the autoclave. The product was dried under reduced pressure in a vacuum drier at 215°C for one hour to remove volatiles.

The resulting graft copolymer contained about 100 g. of low molecular weight homopolystyrene and a solution of 2.0 g. of said copolymer in 40 ml. of methylene chloride formed 0.25 g. of precipitate after 3 hours. The precipitate contained less than 3% of polystyrene.

CONTROL EXAMPLE 5

Example 15 was repeated, except that the amount of di-tert-butyl peroxide was reduced to 0.05 g. The resulting polymer contained 86% polyphenylene ether. A solution of 2.0 g. of this polymer in 40 ml. of methylene chloride formed 1.44 g. of precipitate after 3 hours. The precipitate contained little polystyrene.

CONTROL EXAMPLE 6

Example 1 was repeated, except that the amount of di-tert-butyl peroxide was increased to 8 g. The resulting polymer contained 40% polyphenylene ether. A solution of 2.0 g. of this polymer in 40 ml. of methylene chloride formed no precipitate at all even after 24 hours. But, the film derived from this polymer was deficient in the property of self-maintenance and a blended resin of this polymer with a rubber reinforced polystyrene (1 : 1) produced only cracked molded articles, on which no physical property could be measured.

The present invention is predicated on the finding that when specific conditions are adopted at the time of polymerizing styrene type compounds in the presence of polyphenylene ethers, graft copolymers entirely free from polyphenylene ether homopolymers can be obtained, and thus the invention provides novel materials usable for many purposes.

What we claim is:

1. A process for producing graft copolymers containing substantially no polyphenylene ether homopolymers comprising graft polymerizing with stirring under anhydrous conditions 20 to 200 parts of a styrene type compound of the group consisting of styrene, lower alkyl styrene and halostyrenes at a temperature of 130°C to 200°C in the presence of 100 parts by weight of a polyphenylene ether represented by the formula

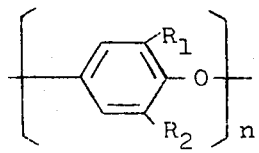

where $R_1$ and $R_2$ are alkyl of 1 to 4 carbon atoms or a halogen atom, $n$ is the degree of polymerization and has a number average between 50 and 300, and 0.1 to 15 parts by weight of a radical initiator based on the polyphenylene ether.

2. A process according to claim 1 wherein the styrene type compound is styrene.

3. A process according to claim 2 wherein the temperature is 135° to 190°C.

4. A process according to claim 3 wherein the styrene is used in an amount of 25 to 170 parts per 100 parts of polyphenylene ether.

5. A process according to claim 4 wherein $R_1$ and $R_2$ are both methyl.

6. A process according to claim 1 wherein the polyphenylene ether has a number average polymerization degree between 60 and 280.

7. A process according to claim 6 wherein the polyphenylene ether has a number average polymerization degree between 70 and 250.

8. A process according to claim 1 carried out in the absence of a solvent.

9. A process according to claim 1 carried out in an organic solvent inert under the reaction conditions.

10. A process according to claim 9 wherein the solvent is a hydrocarbon.

11. A process according to claim 9 wherein the solvent is an aromatic hydrocarbon or a halogenated aromatic hydrocarbon.

12. A process according to claim 11 wherein the solvent is an alkyl benzene.

13. A process for producing graft copolymers containing substantially no polyphenylene ether homopolymers consisting essentially of graft polymerizing with stirring under anhydrous conditions in the absence of a solvent 25 to 170 parts of styrene at a temperature of 135° to 190°C in the presence of 100 parts by weight of poly(2,6-dimethylphenylene-1,4-ether) having a number average polymerization degree between 70 and 250 and 0.3 to 10 parts by weight of a radical initiator based on the polyphenylene ether.

14. A process for producing graft copolymers containing substantially no polyphenylene ether homopolymers consisting essentially of graft polymerizing with stirring under anhydrous conditions in an organic solvent inert under the reaction conditions 25 to 170 parts of styrene at a temperature of 135° to 190°C in the presence of 100 parts by weight of poly(2,6-dimethylphenylene-1,4-ether) having a number average polymerization degree between 70 and 250 and 0.3 to 10 parts by weight of a radical initiator based on the polyphenylene ether.

15. A graft copolymer prepared by the process of claim 1.

16. A graft copolymer prepared by the process of claim 5.

17. A graft copolymer prepared by the process of claim 13.

18. A graft copolymer prepared by the process of claim 14.

* * * * *